Jan. 21, 1930. R. T. OSMAN 1,744,494
CLUTCH CONTROL
Filed June 6, 1928 2 Sheets-Sheet 1
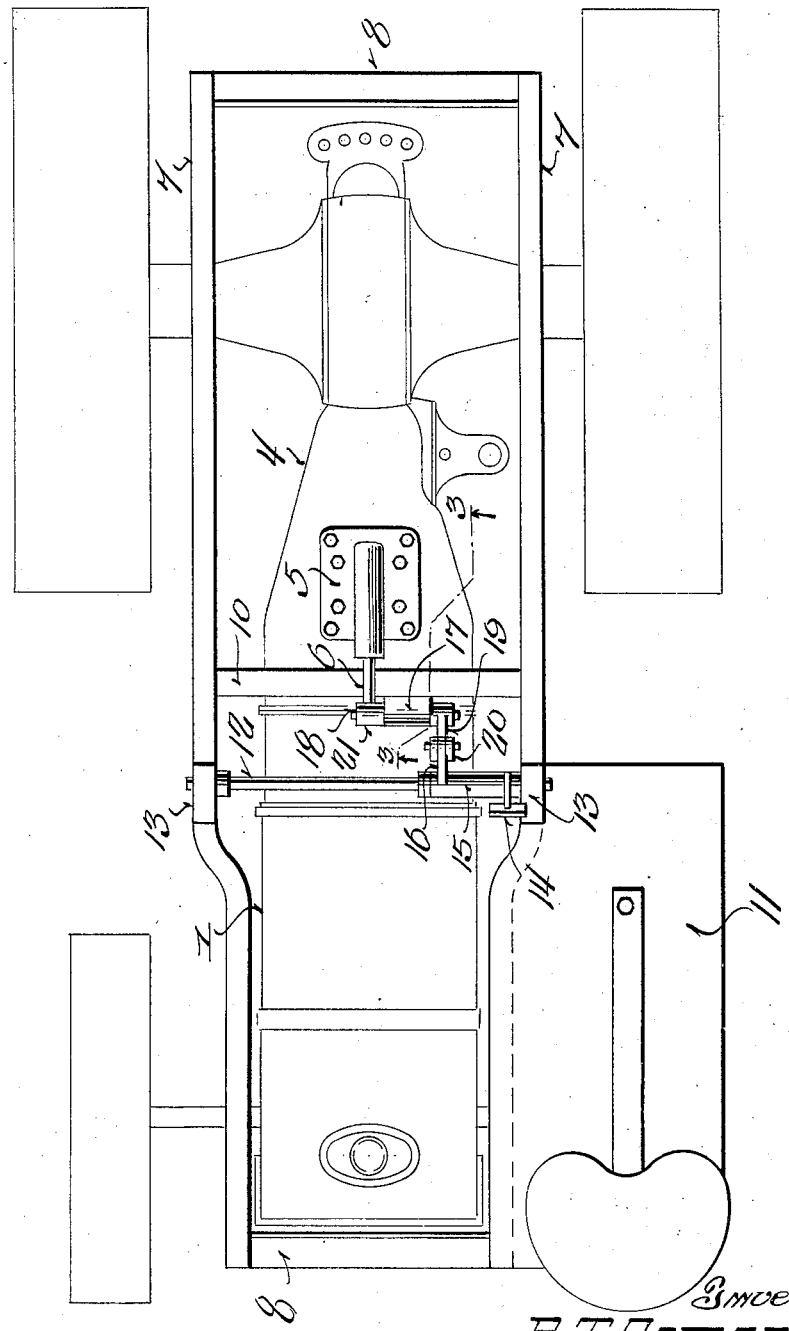
Inventor.
R. T. Osman Jan. 21, 1930. R. T. OSMAN 1,744,494
CLUTCH CONTROL
Filed June 6, 1928 2 Sheets-Sheet 2
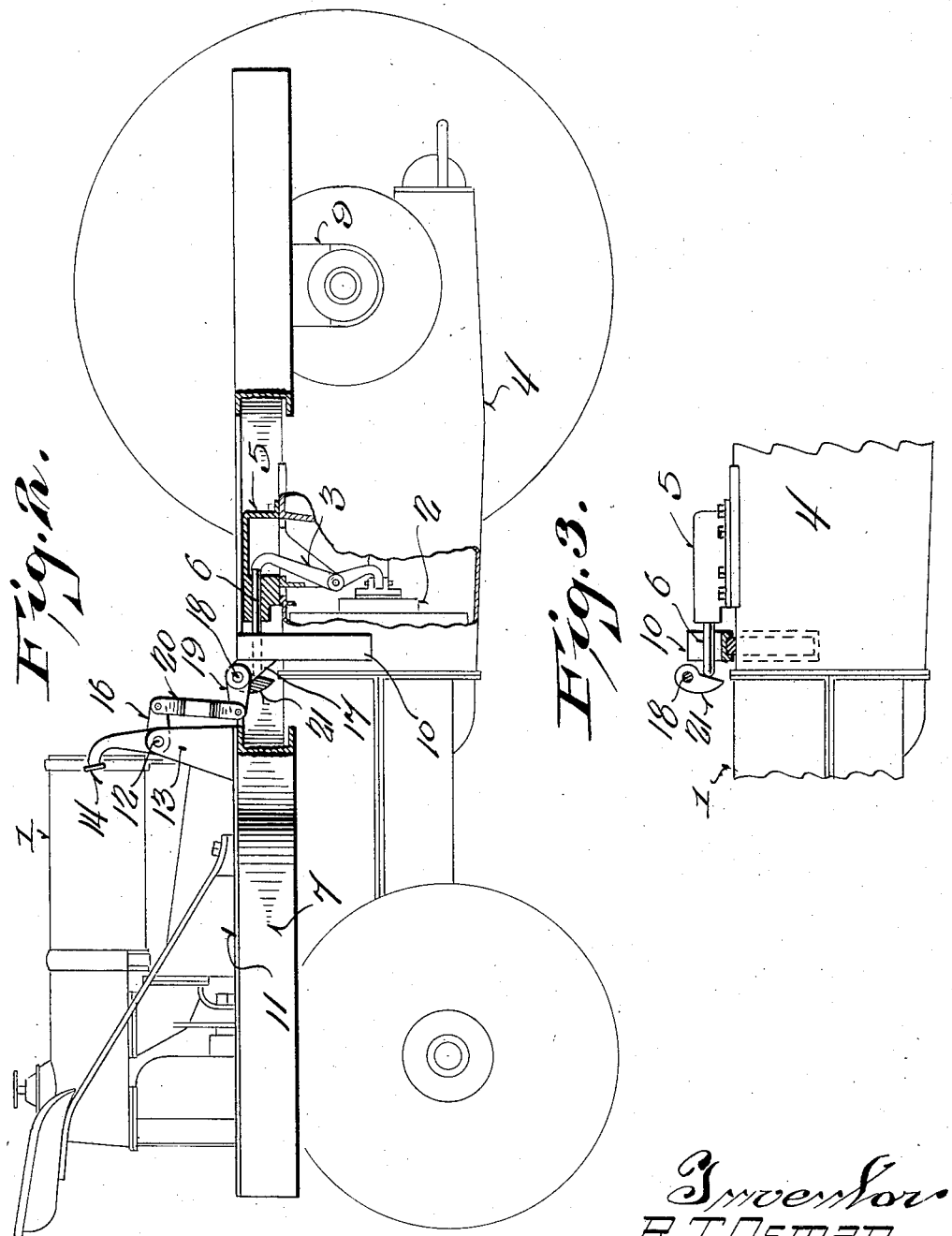
Inventor
R. T. Osman

UNITED STATES PATENT OFFICE

RALPH T. OSMAN, OF MANSFIELD, OHIO

CLUTCH CONTROL

Application filed June 6, 1928. Serial No. 283,396.

This invention pertains to clutch control attachments for conventional tractors, and has primarily for its object to provide a clutch control which may be attached to a standard type of tractor without altering its structure, and which brings the control of the clutch within convenient reach of the operator in instances where attachments to the tractor make it necessary to change the operator's position from that originally provided.

A more specific object is to provide an attachment for conventional tractors, which renders the clutch operable from one side of the machine and in the reverse direction from that originally provided.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is a plan view of a conventional type of tractor equipped with the present invention.

Figure 2 is an elevation of the same, with parts broken away and in section to more clearly illustrate structural details.

Figure 3 is a detailed sectional view taken on the line 3—3 of Figure 1.

Referring now more particularly to the accompanying drawings, the numeral 1 designates a conventional type of tractor provided with the usual clutch 2 and clutch lever 3 housed within the transmission housing 4. In applying the present attachment to a conventional tractor of the type disclosed, the usual transmission cover, which carries the clutch cam and pedal, is removed and the cap 5 substituted therefor. The cap 5 has slidably journaled therein a plunger 6 which engages the clutch lever 3 for the purpose of actuating the same.

In addition to the cap 5, which carries the plunger 6, a suitable frame is attached to the tractor, which in the present instance, comprises a pair of longitudinal side frame members 7 connected at their ends by cross bars 8. The side frames 7 are supported upon and secured to the axle housing of the tractor by yokes 9. In addition to the foregoing means of attachment, the side frames 7 are connected intermediate their ends by a yoke 10 adapted to straddle the transmission housing 4, thus cooperating with the yokes 9 to support the side frames.

In providing the frame attachment for the tractor, the operator's seat is necessarily removed from the rear of the tractor and inasmuch as the direction of travel of the tractor in this instance is reversed, the operator's seat is positioned upon a platform 11 carried by one of the side frames 7. Therefore, in order to render the clutch control accessible and convenient to the operator's seat, a shaft 12 is mounted transversely of the frame member 7 in brackets 13 carried by the frames. Mounted on the shaft 12 adjacent one side, convenient to the operator's seat, is a clutch pedal 14, the hub 15 of which is provided with an offset arm 16.

Attached to the yoke 10 at a point intermediate its ends, is a bearing bracket 17 which carries a stub shaft 18. Secured to one end of the stub shaft is an arm 19 connected to the arm 16 of the clutch pedal by means of the link 20. Thus as the pedal is actuated, oscillatory motion is transmitted to the stub shaft 18. The opposite end of the stub shaft 18 has secured thereon the clutch cam 21, which is alined with and normally engages the slidable plunger 6, and as oscillatory movement is transmitted to the stub shaft 18, the cam 21 engaging the plunger 6, will force the same inwardly actuating the clutch arm 3 to release the clutch.

From the foregoing explanation considered in connection with the drawings, it is obvious that a simple attachment has been provided which will effectually and conveniently permit operation of the clutch from one side of the machine and in the opposite direction from that originally provided. This allows that portion of the tractor to the rear of the engine to be left clear for any type of attachment, such as a dump body, winch, hoist, or the like, and without altering the structure of the tractor, allows the clutch control to be brought to a point convenient to the operator.

I claim:

1. A clutch control attachment for tractors comprising a pair of said frames secured to the tractor and extending along its opposite sides, a cross member connecting said side frames intermediate their ends, a cap for attachment to the top of the transmission housing and in the longitudinal center thereof, a stub shaft carried by said cross member transversely to said plunger, a clutch cam mounted on one end of said stub shaft in alinement with said plunger, an arm mounted upon the opposite end of said stub shaft, a transverse shaft mounted upon said side frame members, a clutch pedal journaled on said shaft adjacent one of its ends, and a connection between said clutch pedal and the arm mounted upon said stub shaft.

2. A clutch control attachment for tractors comprising a frame, a cross member supported at the central portion of the frame, a cap for attachment to the top of the transmission housing, a plunger slidably mounted within the cap for engagement with the tractor clutch lever, a stub shaft carried by said cross member transversely to the plunger, a clutch cam mounted on one end of the stub shaft in alignment with the plunger, an arm mounted upon the opposite end of the stub shaft, a transverse shaft mounted upon said frame, a clutch pedal journalled on said shaft adjacent one of its ends and operative connection between the clutch pedal and arm mounted upon said stub shaft.

In testimony that I claim the foregoing I have hereunto set my hand at Milwaukee, in the county of Milwaukee and State of Wisconsin.

RALPH T. OSMAN.